May 5, 1936.  C. N. BENSON  2,039,875
TENSION PULLEY FOR TAPE DRIVES IN TEXTILE MACHINERY
Filed April 19, 1935
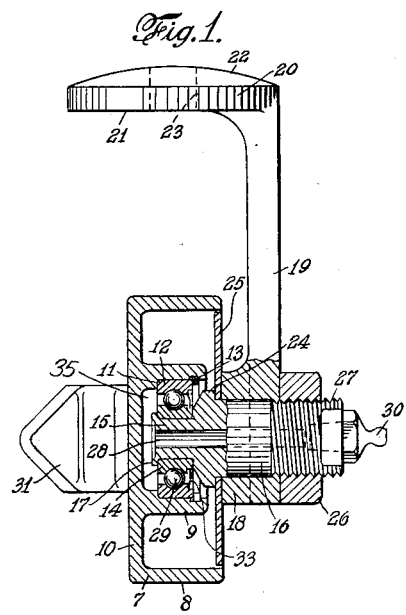
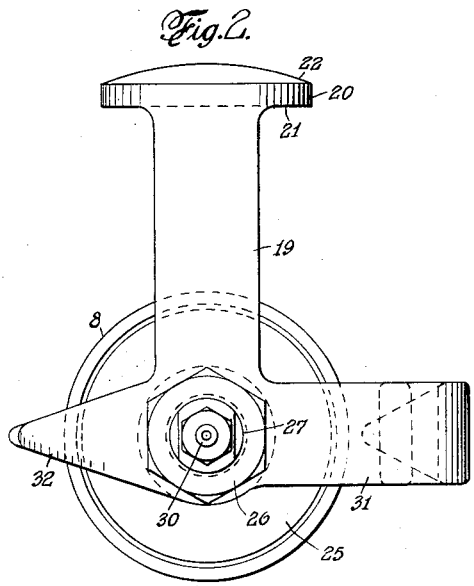
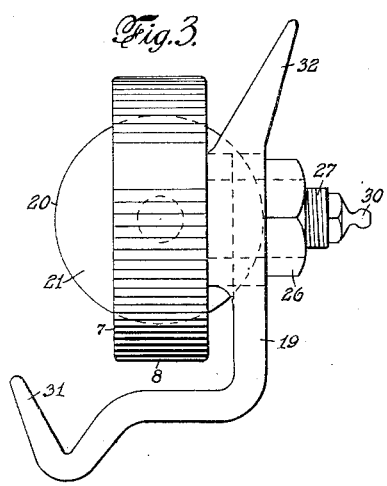
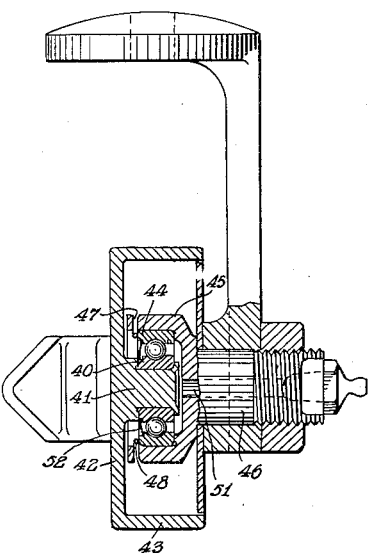
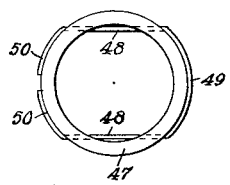
INVENTOR.
Carl N. Benson
BY
his ATTORNEY.

Patented May 5, 1936

2,039,875

UNITED STATES PATENT OFFICE 2,039,875

TENSION PULLEY FOR TAPE DRIVES IN TEXTILE MACHINERY

Carl N. Benson, Jenkintown, Pa., assignor to S K F Industries, Inc., Philadelphia, Pa., a corporation of Delaware Application April 19, 1935, Serial No. 17,277

9 Claims. (Cl. 74—242.12)

My invention relates to improvements in tension pulleys for tape drives in textile machinery and has for an object to provide a bearing mounting and support for a tape pulley of this character. This pulley is primarily designed for supporting the tape which is employed for driving the spindles of twister and spinning frames. It is quite desirable that pulleys used in connection with the belts or tapes of textile machinery be readily mounted and dismounted, that the parts be interchangeable and that the bearing portions be securely housed so that flying lint and dust will not readily enter them.

In the drawing accompanying this specification, two practicable embodiments of my invention are illustrated, in which drawing, Figure 1 shows partly in elevation and partly in axial section a form of my improved device in which the outer race of the ball bearing is mounted to rotate with the pulley.

Figure 2 is a side view of the form of the device illustrated in Figure 1, looking at such figure from the right hand side.

Figure 3 is a view of the device looking at it in the Figure 2 position in a direction upwardly of the sheet of drawing.

Figure 4 is a view similar to Figure 1 of another form of the device where the ball bearing is so mounted that its inner race rotates with the pulley, and Figure 5 is a detail view showing a spring wire clip which may be used for holding the outer bearing ring in its housing member.

In Fig. 1 the drum portion 7 of the pulley is furnished with a substantially cylindrical belt receiving face 8. Inside the drum portion of the pulley there is shown an enlarged hollow hub 9 which is carried by the closed side 10 of the pulley. Within the hollow of the hub there is formed a shoulder 11 against which the side of the outer ring 12 of a ball bearing is pressed, the outer perimeter of the ball bearing preferably having a close fit with the cylindrical bore of the hub. The bearing ring is held in place within the hub by means of a snap ring 13 seated in a groove formed in the bore of the hub. The drawing indicates that this ring is split so that it may be readily removed for the purpose of removing the pulley from the bearing.

The inner ring 14 of the bearing is shown mounted on the spindle end 15 of a carrier member 16. Some suitable means will be employed for holding the bearing ring 14 on the bearing seat of this spindle portion, in the illustration the outer edge of the spindle end 15 which extends beyond the side of the bearing ring is upset as for instance by means of a blow from a suitably formed hammer. The upset portion is indicated by the reference character 17. The body portion 16 of the carrier is shown formed substantially cylindrical and seating in the cylindrical bore of a hub 18 formed on a bracket 19 which has a head 20 adapted to be secured to some portion of the frame. The head is shown as having a flat face 21 on the side toward the pulley wheel and a convex face 22 on the other side for seating in a concave socket formed in the frame. An opening 23 passes thru the head 20 for accommodating a set screw not shown.

Between the cylindrical portion of the body 16 and the reduced spindle 15, there is an outstanding flange 24 which has a substantially square shoulder on the side toward the body portion. There is shown mounted on the body portion and against the shoulder a closure plate 25 having a clearance fit with the inside of the drum portion 7 of the pulley. This closure plate 25 is preferably clamped to the flange 24 and the end of the bracket hub 18 by means of a nut 26 mounted upon screw threads 27 formed on the extending end of the body portion 16. A lubricant reservoir 28 is shown extending throughout the carrier 16 and the spindle, and has an opening into a space 35 inside the closed end 10 of the pulley and which space 35 communicates with the space between the bearing rings in which the set of balls 29 travels.

A lubricant supply connection 30 is shown carried by the outer end of the body portion 16 for supplying lubricant to the reservoir 28.

The bracket is shown carrying a hooked arm 31 for catching the tape should it be accidently slipped off the pulley or be intentionally removed, and also a slanting guide member 32 for protecting and accommodating the belt.

In this form of the device it will be seen that the inner ring 14 of the ball bearing is fast on a non-rotating member, namely the spindle 15 of the body portion 16 which is clamped to the bracket and that the outer race 11 of the bearing being carried by the hub 9 of the pulley rotates with it.

When it is desired to remove the pulley from the bracket it is merely necessary to remove the nut 26 and withdraw the body portion of the carrier 16 from the hub 18. The closure plate 25 may then be removed from the carrier member and access will be had to the inside of the pulley and to the bearing. It will preferably be provided on its side toward the bracket with a lubricant retaining member 33 which member and the outer bearing ring 11, are held in place by means of the snap ring 13.

In the form of my invention illustrated in Fig. 4, the inner ring 40 of the ball bearing is mounted on a solid hub 41 carried by the closed end 42 of the pulley which has a drum member 43 overhanging the hub member and the bearing. The outer ring 44 of the bearing is mounted in the bore of the large end 45 of the carrier member 46. This end 45 preferably has a cylindrical bore within which the outer ring 44 of the bearing bottoms on a suitable shoulder. The portion 45 extends well beyond the outer side of the bearing ring 44 and is shown slotted on both sides at 47 for receiving the straight side members 48 of a spring or snap wire, the connecting portion 49 of the wire passing over the outer side of the unslotted portion of the member 45 and the ends 50 of the wire being bent over the opposite side. The snap wire device not only holds the ball bearing outer ring in position but also holds a lubricant retaining plate 52. In this case a shorter lubricant reservoir 51 is provided since it leads to a space provided between the extreme bottom of the ball bearing cavity and the end of the hub 41.

Having thus described my invention, I claim and desire to secure by Letters Patent:

1. In a tension pulley for a tape drive, the combination with a pulley drum having a closed side and an open side, there being a hub carried by the closed side of the pulley within the drum, of a ball bearing comprising inner and outer race rings, and a set of balls travelling thereon; and a carrier: one of the said hub and carrier members being formed with a bore within which the outer race ring of the bearing is mounted, the other of the said members being formed with a spindle portion on which the inner ring is mounted.

2. In a tension pulley for a tape drive, the combination with a bracket member having a head formed with a convex face adapted to seat in a cavity on a machine frame and form one member of a ball and socket joint, a pulley drum having a closed side and an open side, there being a hub carried by the closed side of the pulley within the drum, of a ball bearing comprising inner and outer race rings, and a set of balls travelling thereon; and a carrier mounted in the bracket: one of the said hub and carrier members being formed with a bore within which the outer race ring of the bearing is mounted, the other of the said members being formed with a spindle portion on which the inner ring is mounted.

3. In a tension pulley for a tape drive, the combination with a bracket member having a head formed with a convex face adapted to seat in a cavity on a machine frame and form one member of a ball and socket joint, a pulley drum having a closed side and an open side, there being a hub carried by the closed side of the pulley within the drum, of a ball bearing comprising inner and outer race rings, and a set of balls travelling thereon; and a carrier mounted on the bracket: one of the said hub and carrier members being formed with a spindle portion on which the inner ring of the bearing is mounted, the other of said members being formed with a bore within which the outer race ring is mounted and a snap retaining member for holding the bearing ring within said bore.

4. In a tension pulley for a tape drive, the combination with a pulley drum having a closed side and an open side, there being an enlarged hollow hub carried by the closed side of the pulley within the drum, of a ball bearing comprising inner and outer race rings, and a set of balls travelling thereon, the inner ring of the bearing being mounted in the bore within the hub, such bore having a circumferential groove, a snap retaining ring seated in said groove, there being a lubricant retaining plate between the bearing ring and the snap retaining ring, and a carrier having a spindle portion on which the inner ring of the bearing is mounted.

5. In a tension pulley for a tape drive, the combination with a pulley drum having a closed side and an open side, there being an enlarged hollow hub carried by the closed side of the pulley within the drum, of a ball bearing comprising inner and outer race rings, and a set of balls travelling thereon, the inner ring of the bearing being mounted in the bore within the hub, such bore having a circumferential groove, a snap retaining ring seated in said groove, there being a lubricant retaining plate between the bearing ring and the snap retaining ring, a carrier having a cylindrical body portion and a spindle portion on which the inner ring of the bearing is mounted, there being a flange on the body portion adjacent the spindle portion, and a closure plate for the open end of the pulley mounted on such body portion.

6. In a device of the character specified, the combination with a pulley drum having a closed side and an open side, there being an enlarged hollow hub carried by the closed side of the pulley within the drum, of a ball bearing comprising inner and outer race rings, and a set of balls travelling thereon, the inner ring of the bearing being mounted in the bore within the hub, such bore having a circumferential groove, a snap retaining ring seated in said groove, there being a lubricant retaining plate between the bearing ring and the snap retaining ring, a carrier having a cylindrical body portion and a spindle portion on which the inner ring of the bearing is mounted, there being a flange on the body portion adjacent the spindle portion, and a closure plate for the open end of the pulley mounted on such body portion, the outer end of the carrier being screw threaded and a nut mounted on such screw thread.

7. In a device of the character specified, the combination with a pulley drum having a closed side and an open side, there being an enlarged hollow hub carried by the closed side of the pulley within the drum, of a ball bearing comprising inner and outer race rings, and a set of balls travelling thereon, the inner ring of the bearing being mounted in the bore within the hub, such bore having a circumferential groove, a snap retaining ring seated in said groove, there being a lubricant retaining plate between the bearing ring and the snap retaining ring, a carrier having a cylindrical body portion and a spindle portion on which the inner ring of the bearing is mounted, there being a flange on the body portion adjacent the spindle portion, a closure plate for the open end of the pulley mounted on such body portion, the outer end of the carrier being screw threaded and a nut mounted on such screw threads, and a bracket having a hub furnished with a cylindrical bore in which the cylindrical body portion of the carrier member is mounted, the hub being located between the closure plate and the nut on the screw threaded end of the body portion.

8. In a tension pulley for a tape drive, the combination with a pulley drum having a closed side and an open side, there being a hub carried by the closed side of the pulley within the drum, of a ball bearing comprising inner and outer race rings, and a set of balls travelling thereon, the inner race ring mounted on the hub, a carrier formed with a bore within which the outer race ring of the bearing is mounted, and a snap retaining member for holding the bearing ring within the said bore.

9. In a tension pulley for a tape drive, the combination with a pulley drum having a closed side and an open side, there being a hub carried by the closed side of the pulley within the drum, of a ball bearing comprising inner and outer race rings, and a set of balls travelling thereon; a carrier; one of the said hub and carrier members being formed with a spindle portion on which the inner ring of the bearing is mounted, the other of said members being formed with a bore within which the outer race ring is mounted; a snap retaining member for holding the bearing ring within said bore.

CARL N. BENSON.